United States Patent
Rabasco et al.

(12) 
(10) Patent No.: US 6,593,412 B1
(45) Date of Patent: Jul. 15, 2003

(54) WATER BASED EMULSION COPOLYMERS INCORPORATING VINYL ETHYLENE CARBONATE

(75) Inventors: John Joseph Rabasco, Allentown, PA (US); Carrington Duane Smith, Slatington, PA (US); Richard Henry Bott, Macungie, PA (US)

(73) Assignee: Air Products Polymers, L.P., Allentown, PA (US)

( * ) Notice: Subject to any disclaimer, the term of this patent is extended or adjusted under 35 U.S.C. 154(b) by 190 days.

(21) Appl. No.: 09/671,095

(22) Filed: Sep. 27, 2000

(51) Int. Cl.$^7$ .................................................. C08F 2/16
(52) U.S. Cl. ...................... 524/459; 523/201; 524/503; 526/201; 526/202; 526/269; 526/270; 526/314
(58) Field of Search ................... 523/201; 524/459, 524/503; 526/201, 202, 269, 270, 314

(56) References Cited

U.S. PATENT DOCUMENTS

| | | | |
|---|---|---|---|
| 2,511,942 A | 6/1950 | Prichard | 200/338 |
| 4,263,418 A | 4/1981 | Steffen et al. | 525/277 |
| 4,329,267 A * | 5/1982 | Riebel et al. | 264/9 |
| 5,567,527 A | 10/1996 | Webster et al. | 428/412 |
| 5,962,556 A * | 10/1999 | Taylor | 523/410 |
| 6,060,556 A * | 5/2000 | Collins et al. | 524/533 |
| 6,297,328 B1 * | 10/2001 | Collins et al. | 525/328.6 |
| 6,339,129 B1 * | 1/2002 | Webster | 525/327.2 |

FOREIGN PATENT DOCUMENTS

| | | | |
|---|---|---|---|
| WO | 9962968 | 12/1999 | C08F/10/00 |
| WO | 9962970 | 12/1999 | C08F/18/24 |

OTHER PUBLICATIONS

"Synthesis of Cyclic Carbonate Functional Polymers," by Dean C. Webster and Allen L. Craine, *ACS Symposium Series 704*, American Chemical Society, 1998, Chapter 21, pp. 303 to 320.

"Cyclic Carbonate Functional Polymers: Synthesis and Applications," by Dean C. Webster, *Polymer News*, 1998, vol. 23, pp. 187–193.

"Synthesis of Cyclic Carbonate Functional Polymers," by Dean C. Webster and Allen L. Crain, *Polym. Mater. Sci. Eng.*, 1997, vol. 76, pp. 302–303.

"Polymerization of Vinyl ethylene Carbonate and the Reaction of the Formed Polymer," by Teruzo Asahara, Manabu Imoo, and Takeshi Imai, *Production Research*, 1973, vol. 25, No. 7, pp. 1–9.

\* cited by examiner

*Primary Examiner*—Judy M. Reddick
(74) *Attorney, Agent, or Firm*—Mary E. Bongiorno

(57) ABSTRACT

Aqueous based emulsion copolymers containing vinyl ethylene carbonate, vinyl acetate, and one or more other ethylenically unsaturated monomers, and aqueous based poly(vinyl alcohol)-containing emulsion copolymers formed by emulsion copolymerization of vinyl ethylene carbonate, vinyl acetate, and optionally one or more other ethylenically unsaturated monomer, in the presence of poly(vinyl alcohol). These emulsion copolymers can be used in a variety of applications such as adhesives and coatings.

6 Claims, No Drawings

WATER BASED EMULSION COPOLYMERS INCORPORATING VINYL ETHYLENE CARBONATE

BACKGROUND OF THE INVENTION

Limited information exists in the literature regarding the copolymerization of vinyl ethylene carbonate (VEC), especially the formation of emulsion copolymers incorporating VEC. "Synthesis of cyclic carbonate functional polymers," by Dean C. Webster and Allen L. Crain, ACS Symposium Series 704, American Chemical Society, 1998, Chapter 21, pages 303 to 320, contains a review of VEC copolymerization. Emulsion copolymerization of VEC with vinyl acetate and butyl acrylate is reported. Up to 15% VEC was incorporated into vinyl acetate/butyl acrylate latexes containing 20% butyl acrylate and 65 to 78% vinyl acetate.

U.S. Pat. No. 2,511,942 (Prichard, 1950) discloses the preparation of VEC and indicates that it can be copolymerized with other unsaturated monomers, such as ethylene, isobutylene, styrene, vinyl chloride, vinyl acetate, and vinyl acrylics. Emulsion copolymerization is not disclosed.

"Polymerization of vinyl ethylene carbonate and reaction of the formed polymer," by Teruzo Asahara, et al. (Production Research, Vol.25, No.7, 1973), discloses free radical polymerization of VEC with each of styrene, vinyl acetate, and maleic anhydride.

U.S. Pat. No. 5,567,527 (Webster et al., 1996) discloses carbonate functional copolymers formed from the free-radical copolymerization of VEC with other ethylenically unsaturated monomers such as acrylic and methacrylic acids and their esters, styrene-type monomers, vinyl chloride, vinyl acetate, allyl compounds, and acrylamide. The copolymers can be crosslinked with multifunctional primary amines and are reported to be useful in two-component crosslinked or thermosetting organic coatings. Emulsion copolymers are formed in the presence of surfactants and comprise water and a curable acrylic copolymer containing 1 to 50 wt % VEC, based on the total weight of monomers. An example shows the formation of an emulsion copolymer of VEC with vinyl acetate and butyl acrylate.

WO 99/62970 (Webster et al., 1999) discloses a process for the free radical copolymerization of VEC with other unsaturated monomers. Examples show the emulsion polymerization of VEC with vinyl acetate and butyl acrylate to form copolymers in which the ratio of VEC to other monomers is 25:75.

U.S. Pat. No. 4,263,418 (Steffen et al., 1981) discloses graft copolymers consisting of 10 to 80 wt % ethylene/vinyl ester copolymer containing 1 to 75 wt % vinyl ester; and 90 to 20 wt % of a grafted monomer mixture consisting essentially of: 5 to 50 wt % acrylonitrile and/or methacrylonitrile; 95 to 50 wt % of one or more aromatic monovinyl compound; and small quantities (0.01 to 0.5% by weight) of copolymerized allyl compound, such as VEC or diallyl carbonate.

WO 99/62968 (Mackenzie, et al., 1999) discloses supported group 8-10 transition metal olefin polymerization catalysts. Solution polymerization of 96.5 to 95.5 wt % ethylene and 3.5 to 4.5 wt % VEC is shown in examples 77 and 78.

BRIEF SUMMARY OF THE INVENTION

This invention is directed to aqueous based emulsion copolymers containing vinyl ethylene carbonate (VEC), ethylene and at least one other ethylenically unsaturated monomer. One embodiment of this invention is the incorporation of VEC into vinyl acetate-ethylene emulsion copolymers. Another embodiment is aqueous based poly (vinyl alcohol)-containing emulsion copolymers that are formed by copolymerizing VEC with vinyl acetate and, optionally, another ethylenically unsaturated monomer in the presence of poly(vinyl alcohol). The aqueous based poly(vinyl alcohol)-containing emulsion copolymer can be a grafted poly(vinyl alcohol) polymer. Yet another embodiment of this invention is the use of emulsion copolymers of VEC and other ethylenically unsaturated monomers such as vinyl acetate or vinyl acrylic compounds in adhesive applications, such as wood glue.

There are several advantages to incorporating VEC into emulsion copolymers.

For example:

- the emulsion copolymers exhibit good adhesive properties;
- the $T_g$ (glass transition temperature) of the emulsion copolymer can be increased;
- a two stage emulsion polymerization can be used to produce VEC-vinyl acetate-ethylene emulsion copolymers with a high ethylene content; and
- incorporation of other ethylenically unsaturated monomers into poly(vinyl alcohol)-containing polymers, can be enhanced.

The VEC emulsion copolymers of this invention can be used in a variety of applications, such as adhesives, coatings, and nonwovens and paper applications.

DETAILED DESCRIPTION OF THE INVENTION

VEC can be emulsion copolymerized with vinyl acetate and a variety of other ethylenically unsaturated monomers using standard emulsion polymerization procedures as practiced in the industry.

The emulsion copolymers comprise 2 to 30 wt % of VEC, 2 to 50 wt % ethylene, and 20 to 96 wt % of one or more additional ethylenically unsaturated copolymerizable monomer, based on the total monomers.

Suitable ethylenically unsaturated monomers which can be employed for emulsion copolymerization with VEC and ethylene include, but are not limited to, vinyl acetate, vinyl chloride, $C_1$ to $C_{12}$ alkyl acrylates, and $C_1$ to $C_{12}$ alkyl methacrylates, such as ethyl methacrylate, methyl methacrylate, 2-ethylhexyl acrylate, butyl acrylate, propyl acrylate, ethyl acrylate, methyl acrylate, hydroxyethyl acrylate, and hydroxypropyl acrylate, and mixtures thereof.

It has been found that ethylene cannot be emulsion copolymerized with VEC in the absence of another ethylenically saturated monomer such as vinyl acetate. It has also been found that incorporation of ethylene is retarded in the preparation of copolymer of ethylene with VEC and another ethylenically unsaturated monomer, using typical emulsion polymerization techniques. However, unexpectedly it has been found that use of a two stage polymerization process is effective in making copolymers containing the amounts of monomers described above.

In the two stage emulsion polymerization, about 30 to 70% of the total monomers (containing about 50% of an ethylenically unsaturated other than ethylene or VEC, and about 50% ethylene) can be reacted in one stage and about 70 to 30% of the total monomers (containing about 30% VEC and about 70% of the other ethylenically unsaturated monomer) can be reacted in another stage using well known emulsion polymerization methods. The order of the above reactions can be reversed, provided that the second reaction is carried out in the presence of the product of the first reaction.

Polymerization can be initiated by thermal initiators or by a redox system. A thermal initiator is typically used at temperatures at or above about 70° C. Redox systems are typically used at temperatures below about 70° C. The amount of thermal initiator used in the process is 0.1 to 3 wt %, preferably about 0.5 wt %, based on total monomers. Thermal initiators are well known in the emulsion polymer art and include, for example, ammonium persulfate, sodium persulfate, and the like. The amount of oxidizing and reducing agent in the redox system is about 0.1 to 3 wt %. Any suitable redox system known in the art can be used; for example, the reducing agent can be a bisulfite, a sulfoxylate, ascorbic acid, erythorbic acid, and the like. The oxidizing agent can include hydrogen peroxide, organic peroxide such as t-butyl peroxide, persulfates, and the like.

In addition to the above reaction conditions and components, the polymer latex may be stabilized with conventional emulsifiers or surfactants, and protective colloids.

The protective colloid can be poly(vinyl alcohol) in amounts of about 0.5 to 5 wt %, preferably 2 to 5 wt %, based on monomers. The poly(vinyl alcohol) can be 75 to 99+ mole % hydrolyzed, preferably 85 to 90 mole % hydrolyzed, with a degree of polymerization ranging from 50 to 3000; preferably, 100 to 1500. The degree of polymerization of the poly(vinyl alcohol) affects the viscosity of the emulsion product; i.e., as degree of polymerization increases, viscosity of the emulsion product increases.

The surfactant or emulsifier can be used at a level of about 1 to 4 wt %, preferably 1.5 to 3 wt %, based on monomers and can include any of the known and conventional surfactants and emulsifying agents, principally the nonionic and anionic materials, heretofore employed in emulsion copolymerization. Among the nonionic surfactants found to provide good results are the Igepal surfactants supplied by Rhone-Poulenc. The Igepal surfactants are members of a series of alkylphenoxy-poly(ethyleneoxy)ethanols having alkyl groups containing from about 7 to 18 carbon atoms, and having from about 4 to 100 ethyleneoxy units, such as the octylphenoxy poly(ethyleneoxy)ethanols, nonylphenoxy poly(ethyleneoxy)ethanols, and dodecylphenoxy poly(ethyleneoxy)ethanols. Other examples of nonionic surfactants include polyoxyalkylene derivatives of hexitol (including sorbitans, sorbides, manitans, and mannides) anhydride, partial long-chain fatty acid esters, such as polyoxyalkylene derivatives of sorbitan monolaurate, sorbitan monopalmitate, sorbitan monostearate, sorbitan tristearate, sorbitan monooleate and sorbitan trioleate. Pluronic surfactants L-64 and F-68, supplied by BASF, are examples of other commercial nonionic surfactants which can be used in this invention.

It has been found that VEC emulsion copolymers, such as those described above, are effective in adhesive applications, such as wood glue applications. About 2 wt % to 15 wt % VEC, based on total monomers, can improve the adhesive properties of the emulsion copolymer.

Examples of appropriate wood substrates for wood glue applications include hardboard, particle board, fiberboard, oriented strand board, lauan, plywood, chipboard, veneer, and other timber structures.

A poly(vinyl alcohol)-containing emulsion copolymer can be formed by emulsion copolymerizing VEC, vinyl acetate, and one or more other ethylenically unsaturated monomer in the presence of poly(vinyl alcohol) using known emulsion polymerization techniques, such as those described above. The poly(vinyl alcohol)-containing emulsion copolymer can contain a graft copolymer. Poly(vinyl alcohol)-containing emulsion copolymers of this invention can contain 5 to 30 wt % VEC, 25 to 97 wt % vinyl acetate, 0 to 10 wt % ethylenically unsaturated compound other than VEC and vinyl acetate, and 2 to 35 wt % poly(vinyl alcohol), based on the total weight of all components of the emulsion copolymer. Suitable monomers which can be employed for emulsion copolymerization of vinyl acetate with VEC in the presence poly(vinyl alcohol) include, but are not limited to, ethylene, styrene, vinyl chloride, ethylene, $C_1$ to $C_{12}$ alkyl acrylates, and $C_1$ to $C_{12}$ alkyl methacrylates, such as ethyl methacrylate, methyl methacrylate, 2-ethylhexyl acrylate, butyl acrylate, propyl acrylate, ethyl acrylate, methyl acrylate, hydroxyethyl acrylate, hydroxypropyl acrylate, and mixtures thereof. Preferred monomers are ethylene, vinyl chloride, and mixtures thereof.

Other monomers, such as crosslinking monomers, which may be present include, acrylamide, methacrylamide, N-methylolacrylamide, acetoacetoxyethyl methacrylate, maleic acid, alkyl maleate ester, and dialkyl maleate esters, wherein alkyl is $C_1$ to $C_{12}$.

The poly(vinyl alcohol)-containing emulsion copolymer can be formed by way of a free radical reaction. The free radical copolymerization reaction can be conducted in aqueous media at a temperature necessary to liberate free radicals. Typical temperatures range from 30 to 95° C., preferably 40 and 90° C.

Total reaction solids levels can vary from 20 to 65 wt %, preferably from 30 to 60 wt %, depending on the molecular weight of the poly(vinyl alcohol).

Examples of free radical initiators that can be employed in the copolymerization reaction are ammonium persulfate, sodium persulfate, potassium persulfate, tert-butylhydroperoxide, and hydrogen peroxide. Approximately 0.1 to 10 wt % (preferably 0.5 to 3 wt %) of the initiator, based on the amount of total monomer is used.

The poly(vinyl alcohol) used in making poly(vinyl alcohol)-containing emulsion copolymers generally has a weight average molecular weight ($M_w$) ranging from about 5,000 to 300,000, preferably 10,000 to 200,000. Alternatively, the poly(vinyl alcohol) can have a degree of polymerization (Dp) of from 100 to 5,000, preferably 200 to 3500. Poly(vinyl alcohol) is made commercially by the hydrolysis of poly(vinyl acetate) and typically has a hydrolysis level ranging from about 85 to greater than 99 mol %. For free radical emulsion copolymerization, the level of hydrolysis can range from 70 to greater than 99 mol %, preferably 85 to 99 mol % hydrolyzed. Mixed poly(vinyl alcohol) grades, from combinations of poly(vinyl alcohol) polymers which vary in molecular weight and hydrolysis level, can be employed in the polymerization reaction.

The invention will be further clarified by a consideration of the following examples, which are intended to be purely exemplary of the invention.

Comparative Example 1

Emulsion Copolymerization of VEC and Ethylene
The reactor was charged with the following mixture:

| Material | Mass charged, g |
|---|---|
| DI Water | 1150 |
| Ferric Ammonium Sulfate (5% aqueous solution) | 4.0 |
| Natrosol 250 HR (1.5% aqueous solution) | 133 |
| Igepal CO-887 (70% aqueous solution) | 89.6 |
| Igepal CO-630 | 20.9 |
| Polystep B-27 (30% aqueous solution) | 44.3 |
| VEC | 190 |
| Ethylene | 150 |

The following delay mixtures were utilized:

| Material |
|---|
| Aqueous 3.0% tertiary-butyl hydroperoxide (t-BHP) |
| Aqueous 2.5% sodium formaldehyde sulfoxylate (SFS) |

An initial aqueous solution was added to a previously nitrogen purged one-gallon reactor. Next, agitation at 200 rpm was begun and 190 g (1.67 moles) of the VEC monomer was charged. The agitation was increased to 300 rpm and the mixture was heated to 40° C. Ethylene (150 g; 5.35 moles) was then added to the reactor. The aqueous t-BHP and SFS solutions were added at a rate of 1.0 ml/min. After about one hour of redox agent flow, no initiation (as indicated by rise in reactor temperature and increased solids content of mixture) had been observed. The solids content in the mixture at this point was measured to be 5.8 wt %, which is the exact concentration of surfactant solids in the mixture at this point. Thus, no conversion of monomer had occurred in this mixture, indicating that in this typical redox initiated emulsion polymerization, VEC and ethylene do not react to form polymer.

EXAMPLE 1

Surfactant Stabilized Emulsion Copolymer of VEC with Vinyl Acetate and Ethylene

Surfactant stabilized VEC containing vinyl acetate-ethylene (VAE) emulsions were prepared by the following procedure: A one-gallon stainless steel pressure reactor was charged with the following mixture:

| Material | Mass charged, g |
|---|---|
| DI Water | 1100 |
| Ferric Ammonium Sulfate (5% aqueous solution) | 3.0 |
| Igepal CO-887 (70% solution in water) | 43.7 |
| Igepal CO-630 | 10.4 |
| Natrosol 250LR (2% solution in water) | 100 |
| 50% Citric acid aqueous solution | 1.96 |
| Sodium Citrate | 1.0 |
| Monomer Mix (see delay table) | 190 |

Igepal CO-887 and CO-630; surfactants supplied Rhone-Polenc.
Natrosol 250LR; hydroxyethyl cellulose supplied by Hercules.

The following delay mixtures were utilized:

| Material | Mass charged, g |
|---|---|
| Aqueous 1.0% t-BHP | 165 |
| Aqueous 2.5% sodium erythorbate | 165 |
| Monomer Mixture* | 1740 (total) |
| Vinyl Acetate | 1672 |
| Pluronic L-64 | 17 |
| Pluronic F-68 | 51 |
| Ethylene | 380 | t-BHP = tert-butylhydroperoxide
*190 g of this mixture was the initial charge
Pluronic L-64 and F-68; surfactants supplied by BASF The initial distilled water mixture was adjusted to pH 4.3 with the citric acid. Ferric ammonium sulfate was added and the initial aqueous solution was added to the previously nitrogen purged 1 gallon reactor. Agitation at 200 rpm was then begun and 190 g of the monomer mixture was charged. The agitation was increased to 300 rpm and the mixture was heated to 55° C. The aqueous t-BHP and sodium erythorbate solutions were added at 0.2 ml/min and 0.4 ml/min, respectively. Fifteen minutes after initiation, the flows of the aqueous t-BHP and sodium erythorbate solutions were terminated. At this point, 140 g of monomer mix and 121 g of ethylene were added to a pressure of 500 psi. The aqueous t-BHP and sodium erythorbate solutions were again started, both at 0.4 ml/min. At reinitiation, the remaining monomer mixture feed was begun and the ethylene pressure was maintained at 500 psi for three hours. The aqueous t-BHP and sodium erythorbate solutions feed rates were adjusted to maintain the free vinyl acetate in the reaction at 6–10%. The agitation rate was increased to 400 rpm at 90 minutes, 550 rpm at 120 minutes, and 700 rpm at 150 minutes. When the free vinyl acetate is less than 1.5%, the delay feeds are stopped. Next, the reaction was cooled to 30° C. and transferred to a degasser. The following properties of the resulting emulsion copolymer were measured:

| Accel Seds % | 5.0 |
|---|---|
| $T_g$ onset (° C.) | −16.4 |
| Viscosity (60/12 rpm) (cps) | 440/950 |
| 100/325 mesh coagulum (ppm) | 226/758 |
| % solids | 56.8 |
| Ph | 5.25 |

Additional samples were run in which successively more VEC was substituted for vinyl acetate monomer in the monomer delay. The total amount of redox agents required to convert these polymerizations increased with the increase in VEC content. The data from the samples are summarized in the table below:

| Sample | Monomer Composition Charged | $T_g$ Onset (° C.) | $T_g$ Midpoint (° C.) | Total Redox used, ml |
|---|---|---|---|---|
| 1 (Control) | 80 VAM 20 Ethylene | −16.4 | −9.7 | 220 |
| 2 | 68 VAM 20 ethylene 12 VEC | −11.4 | 2.0 | 465 |
| 3 | 74 VAM 13 ethylene 13 VEC | 4.6 | 19.6 | 330* |

VAM = vinyl acetate monomer
*Double solution concentrations of redox compared to Samples 1 and 2

These samples demonstrate that VEC incorporation into ethylene containing terpolymers is successful in the presence of vinyl acetate. VEC incorporation increased the $T_g$ and also required higher initiator concentrations.

EXAMPLE 2

Surfactant Stabilized Emulsion Copolymers of VEC with Vinyl Acetate and Ethylene Surfactant stabilized VEC containing vinyl acetate-ethylene emulsions were prepared by the following procedure: A one-gallon stainless steel pressure reactor was charged with the following mixture:

| Material | Mass charged, g |
|---|---|
| DI Water | 1037 |
| Igepal CO-887 (70% solution in water) | 40.5 |
| Polystep B-27 (30% aq. solution) | 47.7 |
| Vinyl acetate | 64 |

Polystep B-27; anionic surfactant supplied by Stepan.

The following delay mixtures were utilized:

| Material | Mass charged, g |
|---|---|
| Aqueous 10% ammonium persulfate/2.25% sodium bicarbonate | 137 |
| Aqueous surfactant delay | 135 total |
| Deionized water | 102 |
| Polystep B-27 (30% active) | 70 |
| Sodium vinyl sulfonate (25% active) | 28 |
| Vinyl Acetate | 896 |

The initial aqueous solution was added to the previously nitrogen purged one-gallon reactor. Agitation at 100 rpm was then begun and 64 g of the vinyl acetate was charged. The agitation was increased to 1000 rpm and the mixture was heated to 85° C. The reactor was pressurized with ethylene to 1400 psi. Next, 15 g of initiator solution was added. The surfactant delay as started at 0.56 g/minute and the vinyl acetate delay at 3.7 g/minute. The persulfate delay was started at 0.48 g/minute. The ethylene pressure was maintained at 1400 psi for four hours. When the free vinyl acetate was less than 3%, all delay feeds and the ethylene feed were stopped. Next, the reaction was held at 85° C. for 45 minutes and then cooled and transferred to a degasser. Properties of the resulting emulsion copolymer are shown below:

| | |
|---|---|
| Accel Seds % | 4.0 |
| $T_g$ onset (° C.) | −34.3 |
| Viscosity (60/12 RPM) (cps) | 420/750 |
| 100/325 mesh coagulum (ppm) | 2560/1561 |
| % solids | 58.7 |
| pH | 4.5 |

Several further samples were run in which successively more VEC was substituted for vinyl acetate monomer in the monomer delay. The total amount of initiator required to achieve high conversion in these polymerizations increased with increasing VEC content. Results are summarized in the table below:

| Sample | Monomer Composition Charged (wt %) | $T_g$ Onset (° C.) | $T_g$ Midpoint (° C.) | Total Ethylene Uptake, g |
|---|---|---|---|---|
| 4 | 46 VAM 54 Ethylene | −34.3 | −29.7 | 1100 |
| 5 | 50 VAM 44.6 ethylene 5.4 VEC | −30.8 | −24.5 | 773 |
| 6 | 49 VAM 38 ethylene 13 VEC | −4.2 | 3.0 | 590 |

High ethylene material with $T_g$ in the range of −5 to 5° C. is shown in Sample 6. Although the ethylene uptake was retarded by the presence of VEC, this example shows that high ethylene content VEC-containing materials can be prepared in the presence of vinyl acetate.

EXAMPLE 3

Poly(Vinyl Alcohol)/Surfactant Stabilized Emulsion Copolymers of VEC with Vinyl Acetate, Ethylene, and Acrylic Acid Poly(vinyl alcohol)/surfactant stabilized emulsion copolymer of VEC, vinyl acetate, ethylene, and acrylic acid were prepared by the following procedure utilizing thermal initiation. Using a one-gallon stainless steel pressure reactor, the reactor was charged with the following mixture:

| Material | Mass charged, g |
|---|---|
| DI Water | 790 |
| Airvol ® 203 poly(vinyl alcohol) (15% aq. solution) | 380 |
| Igepal CO-887 (70% solution in water) | 40.7 |
| Vinyl acetate | 75 |

The following delay mixtures were utilized:

| Material | Mass charged, g |
|---|---|
| Aqueous 10% ammonium persulfate/4.2% sodium bicarbonate | 410 |
| Monomer Mixture | 1295.3 total |
| Vinyl Acetate | 1227.6 |

-continued

| Material | Mass charged, g |
|---|---|
| Acrylic Acid | 63.5 |
| n-dodecylmercaptan | 4.2 |

The initial aqueous solution was added to the previously nitrogen purged one-gallon reactor. The agitation was set at 1000 rpm and the mixture was heated to 85° C. and pressurized to 1000 psi with ethylene. The persulfate initiator delay was started at a rate of 2.5 g/minute. At initiation, the monomer mixture feed was begun and the ethylene pressure was maintained at 1000 psi for three hours. The aqueous persulfate feed rate was adjusted to 2 g/minute. When the free vinyl acetate was less than 1.5%, the delay feeds were stopped. Next, the reaction was cooled to 30° C. and transferred to a degasser. Properties of the resulting emulsion polymer are presented below:

| | |
|---|---|
| Accel Seds % | 1.0 |
| $T_g$ onset (° C.) | −25 |
| Viscosity (60/12 RPM) (cps) | 6730/17100 |
| 100/325 mesh coagulum (ppm) | 550/84 |
| % solids | 54.8 |
| pH | 4.55 |

Other samples of this type were prepared, in which VEC was substituted for vinyl acetate in the monomer delay. The total amount of ethylene incorporated in these samples was lower compared to the control without VEC, which incorporated about 700 g of ethylene.

| Sample | Monomer Composition Charged (wt %) | $T_g$ Onset (° C.) | $T_g$ Midpoint (° C.) | Ethylene Uptake (g) |
|---|---|---|---|---|
| 7 | 61.3 VAM 32.4 ethylene 6.3 VEC | −12.2 | −6.3 | 565 |
| 8 | 60.0 VAM 26.7 ethylene 13.7 VEC | −4.2 | 3.0 | 430 |

*Does not include the acrylic acid charged, which was kept constant in all cases

EXAMPLE 4

Two-Stage Emulsion Polymerization of VEC with Vinyl Acetate and Ethylene

A one-gallon stainless steel pressure reactor was charged with the following mixture:

| Material | Mass charged (g) |
|---|---|
| DI Water | 1037 |
| Igepal CO-887 (70% solution in water) | 40.5 |
| Polystep B-27 (30% aq. solution) | 47.7 |
| Vinyl acetate | 64 |

The following delay mixtures were utilized:

| Material | Mass charged (g) |
|---|---|
| Aqueous 10% ammonium persulfate/2.25% sodium bicarbonate | 137 |
| Aqueous surfactant delay | 135 (total mixture) |
| Deionized water | 102 |
| Polystep B-27 (30% active) | 70 |
| Sodium vinyl sulfonate (25 % active) | 28 |
| Monomer Delay #1 | |
| Vinyl Acetate | 600 |
| Monomer Delay #2 | |
| Vinyl Acetate | 476 |
| VEC | 190 |
| Ethylene | 600 |

The initial aqueous solution was added to the previously nitrogen purged 1 gallon reactor. Next, agitation at 100 rpm was begun and 64 g of the VAM was charged. The agitation was increased to 1000 rpm and the mixture was heated to 85° C. The reactor was pressurized with ethylene to 1400 psi. Next, 15 g of initiator solution was added. The surfactant delay was started at 0.50 g/minute and the VAM Monomer Delay #1 at 4.3 g/minute. The persulfate delay was started at 0.48 g/minute. The ethylene pressure was maintained at 1400 psi for two hours at which point 600 g ethylene was added. Monomer Delay #1 was continued for 30 minutes after which Monomer Delay #1 was terminated and Monomer Delay #2 was commenced at a rate of 5.55 g/minute for two hours. When the free vinyl acetate was less than 3%, all delay feeds were stopped. Next, the reaction was held at 85° C. for 45 minutes and then cooled and transferred to a degasser. Properties of the resulting emulsion are shown below:

| | |
|---|---|
| Accel Seds % | 1.0 |
| $T_g$ onset (° C.) | −32.5, 30.6 |
| Viscosity (60/12 RPM) (cps) | 5000/8500 |
| 100/325 mesh coagulum (ppm) | 150/1450 |
| % solids | 50.9 |
| pH | 3.2 |

Films were characterized by DSC (Differential Scanning Calorimetry) to determine the presence of two $T_g$'s, which is characteristic of two-stage polymerizations. DSC confirmed the presence of two onset $T_g$'s, at about −33° C. and 31° C. The overall composition of this latex was 58 wt % VAM, 32 wt % ethylene and 10 wt % VEC.

EXAMPLE 5

Polymerization of VEC and Vinyl Acetate in the Presence of Poly(Vinyl Alcohol) to Form a Poly (Vinyl Alcohol)-Containing Copolymer A 14.2% aqueous solution of Airvol® 523 poly(vinyl alcohol) (569 g, DP~1200, 88% hydrolyzed) and water (490 g) was charged to a 2-liter glass reactor equipped with an overhead stirrer, reflux condenser, nitrogen inlet, and circulating water bath. The reactor was purged with nitrogen for 15 minutes while heating to 60° C. with stirring at 200 rpm. After adding 15 g of 2% aqueous sodium bicarbonate solution to the reactor, 43 g of a monomer solution containing 240 g vinyl acetate and 80 g VEC was then added to the reaction mixture. After stirring for 5 minutes, delay feed of 0.4% aqueous t-butylhydrogen peroxide (100.5 g) and 0.6% aqueous sodium formaldehyde sulfoxylate (100.8 g containing 0.20 g of sodium bicarbonate) were started. At initiation, the remaining monomer solution was delay fed into the reactor over a 1.5 hour period. The stirring speed was increased to 400 rpm during the reaction period. After completion of the catalyst solution delay feed, the reaction mixture was stirred for 30 minutes at 60° C. Additional redox catalyst of 0.30 g sodium formaldehyde sulfoxylate in water (10 g) and 0.30 g t-butylhydrogen peroxide (70%) diluted in water (11 g) was added to the reactor over a 20 minute period. The resulting poly(vinyl alcohol) copolymer emulsion had a total solids of 23.1%, a $T_g$=64.2° C., 1.0% accelerated sedimentation, and a Brookfield viscosity (20 rpm, 25° C.)=3420 centipoise. The overall composition of this latex was 20 wt % poly(vinyl alcohol), 60 wt % vinyl acetate, and 20 wt % VEC.

EXAMPLE 6

Polymerization of VEC and Vinyl Acetate in the Presence of Poly(Vinyl Alcohol) to Form a Poly (Vinyl Alcohol)-Containing Copolymer A 14.1% aqueous solution of Airvol® 523 poly(vinyl alcohol) (179.4 g, DP~1200, 88% hydrolyzed), 19.1% aqueous solution of Airvol® 203 poly(vinyl alcohol) (99.5 g, DP~300, 88% hydrolyzed), 1% aqueous ferrous ammonium sulfate (2.3 g), and water (187 g) were charged to a 2-liter glass reactor equipped with an overhead stirrer, reflux condenser, nitrogen inlet, and circulating water bath. The reactor was purged with nitrogen for 15 minutes while heating to 60° C. with stirring at 200 rpm. A 2% aqueous sodium bicarbonate solution (22.0 g of sodium bicarbonate) and 112 g of a monomer solution containing 753.4 g vinyl acetate and 88.6 g vinyl ethylene carbonate was added to the reactor. Separate delay feeds of activator (1.6 g sodium formaldehyde sulfoxylate, 0.32 g sodium bicarbonate, 150 g water) and oxidant (0.80 g t-butylhydroperoxide (70%) and 192 g water) were started simultaneously. At initiation, the remaining monomer solution was added to the reactor over a 2.75 hour period. The agitation was increased to 350 rpm during the reaction period. The resulting copolymer emulsion consisted of 52.5% solids, $T_g$=53.8° C., 0.5% accelerated sedimentation, and Brookfield viscosity (30 rpm, 25° C.)=5930 centipoise. The latex emulsion copolymer contained of 85 wt % vinyl acetate, 5 wt % poly(vinyl alcohol), and 10 wt % VEC.

EXAMPLE 7

Effect of VEC on Amount of Vinyl Acetate in Poly (Vinyl Alcohol)-Containing Emulsion Copolymer In general, the procedure of Example 6 was followed. Vinyl acetate was polymerized in the presence of poly(vinyl alcohol) without adding VEC and with two different amounts of VEC. Evidence for enhanced incorporation of poly(vinyl alcohol) into the emulsion copolymer when VEC was used in the emulsion copolymerization of vinyl acetate in the presence of poly(vinyl alcohol) is shown in the table below. When 80% vinyl acetate was polymerized in the presence of partially hydrolyzed poly(vinyl alcohol) (Airvol® 523), analysis of the serum shows that 22 wt % of the total poly(vinyl alcohol) forms a copolymer with vinyl acetate (sample 9). However, when a portion of the vinyl acetate monomer was replaced with VEC, the amount of poly(vinyl alcohol) in the polymer phase nearly doubled to 37.6 wt % and 42 wt % (samples 10 and 11).

| Sample | Composition | PVOH in Polymer Phase, wt % |
|---|---|---|
| 9 | 80% VAM/ 20% Airvol 523 | 22.0 |
| 10 | 60% VAM/20% VEC/ 20% Airvol 523 | 42.0 |
| 11 | 60% VAM/10% VEC/ 30% Airvol 523 | 37.6 |

EXAMPLE 8

Poly(Vinyl Alcohol)-Containing Emulsion Copolymers in Coatings

The emulsion copolymer of Example 7 was mixed with diethylene triamine (0.5 molar equivalents relative to VEC) and cast into a film and dried at room temperature. The film was cast by spreading the mixture onto a silver chloride plate, dried under nitrogen, then placed in an infrared (IR) spectrometer. IR analysis at different temperatures was conducted by heating the IR cell within the spectrometer. Subsequent heating of the dried film at 110° C. for 67 hours, showed no reactivity of the VEC carbonyl carbon as observed by infrared analysis. However, if the wet emulsion, mixed with diethylene triamine, was heated to 110° C. for 67 hours prior to casting a film, infrared analysis showed complete reactivity of the VEC carbonyl carbon.

EXAMPLE 9

Use of Poly(Vinyl Alcohol)-Containing Vinyl Acetate-VEC Copolymer Emulsions in Wood Glue Vinyl acetate and based polymer emulsions incorporating vinyl ethylene carbonate and stabilized with poly(vinyl alcohol) were prepared by the following procedure:

One-half molar equivalents of diethylenetriamine (DETA) or Jeffamine D-2000 (relative to VEC content) was added to the VEC containing emulsions. Six g of the test emulsion was spread evenly over the panel surface of a 6"×6" white birch veneer panel. A second piece of white birch veneer was placed on top of the coated piece aligning the grain at 90° to the first ply. Another 6 g of the test emulsion was spread evenly onto a third piece of white birch veneer. The third ply was laid on the second ply, with its grain at 90° to the second ply, and after the proper open time had elapsed (2–5 minutes), the laminate was placed in a room temperature (73–77° F.) Carver Press. The 3-ply lamination was pressed at 50 psi, maintaining pressure for 112 hours at room temperature. The lamination was then removed from the press and allowed to age for 7 days at 73.4±2° F. and at 50%±2% relative humidity prior to testing.

Three days after pressing, the laminate was cut into four coupons using a table saw with a veneer blade. Two grooves were cut widthwise on opposite sides of the coupon one inch from the ends leaving a one inch separation in the middle of the coupon between the grooves. The depth of the groove was completely cut into the second ply but did not touch the third ply (groove 2/3 through second ply).

One week after lamination, Type I testing (a 2 cycle boiling test) was done:

In the first cycle, coupons were:
1. placed in a 2-liter beaker of boiling water for 4 hours.
2. dried for 20 hours at 145°±5° F. in a circulating air oven.
3. checked for ply separations and delamination.

In the second cycle, coupons were:

1. placed in a 2-liter beaker of boiling water for 4 hours.
2. cooled in water to room temperature.
3. checked for ply separations and delamination and then tensile shear tests run on coupons while wet using an Instron.

For Type II testing, the finished laminate was placed in a Carver Press which had been preheated to 225° F. Pressure (200 psi) was applied on the laminate and maintained for 3 minutes. The laminate was then removed from the press and allowed to age for 7 days at 73.40±2° F. and a 50% ±2% relative humidity prior to testing.

Two coupons, 5"×2", were cut with grain running lengthwise from the mid-section of each 6"×6" lamination. One week after pressing, the coupons were subjected to the following three cycle soak test: The 5"×2" specimens were submerged in water at 75°±5° F. (24±3° C.) for 4 hours and then dried at a temperature from 120 and 125° F. (49 to 52° C.) for 19 hours with sufficient air circulation to lower the moisture content (based on oven dry weight) of specimens to a maximum of 8%. This cycle was repeated until all specimens failed or until three cycles were completed, whichever occurred first.

The following table shows the performance of the polymer emulsions in Type I and Type II wood glue applications.

|  | SAMPLE | | |
| --- | --- | --- | --- |
|  | 12<br>97.4% VAM<br>2.6% VEC | 13<br>94.7% VAM<br>5.3% VEC | 14<br>89.5% VAM<br>10.5% VEC |
| Initiator | TBHP/SFS/Fe | TBHP/SFS/Fe | TBHP/SFS/Fe |
| Stabilizer | 2.9% V-523 | 2.9% V-523 | 2.9% V-523 |
| (rel. monomer) | 2.1% V-203 | 2.1% V-203 | 2.1% V-203 |
| Solids (wt %) | 52.7 | 52.5 | 53.0 |
| Accel. Seds. | <0.5% | 0.5% | <0.5% |
| Ph | 5.80 | 5.72 | 5.59 |
| PSD (particle size diameter) | $D_n = 0.450\ \mu m$<br>$D_w = 0.477\ \mu m$<br>(mono-modal) | $D_n = 0.427\ \mu m$<br>$D_w = 0.452\ \mu m$<br>(mono-modal) | $D_n = 0.389\ \mu m$<br>$D_w = 0.415\ \mu m$<br>(mono-modal) |
| $T_g$ (° C.) Onset | 39.1 | 44.6 | 48.5 |
| Midpoint | 44.0 | 50.0 | 53.8 |
| Brookfield Viscosity (cps) | | | |
| rpm | | | |
| 10 | 2360 | 4860 | 9850 |
| 20 | 1950 | 3820 | 7120 |
| 50 | 1600 | 2830 | — |
| 100 | 1430 | — | — |
| Wood Glue Data (ave. psi) | | | |
| Type I (DETA) | 212 | 353 | 248 |
| Type I (D-2000) | 246 | 181 | Wet emulsion gelled |
| Type II (DETA) | delaminated | delaminated | delaminated |
| Type II (D-2000) | delaminated | delaminated | delaminated<br>Wet emulsion gelled |

V-203 = Airvol ® 203 poly(vinyl alcohol) supplied by Air Products and Chemicals, Inc.; 88 mole % hydrolyzed and Dp ~ 300.
V-523 = Airvol ® 523 poly(vinyl alcohol) supplied by Air Products and Chemicals, Inc.; 88 mole % hydrolyzed and Dp ~ 1200.

The data indicate that the poly(vinyl alcohol) stabilized vinyl acetate-VEC copolymer emulsions of samples 12, 13, and 14 were very good Type I wood glue adhesives.

What is claimed is:

1. An aqueous based poly(vinyl alcohol)-containing emulsion copolymer formed by emulsion polymerizing vinyl ethylene carbonate, vinyl acetate, and, optionally, one or more other ethylenically unsaturated monomer, in the presence of poly(vinyl alcohol).

2. The aqueous based poly(vinyl alcohol)-containing emulsion copolymer of claim 1 wherein the one or more other ethylenically unsaturated monomer is selected from the group consisting of a $C_1$ to $C_6$ olefin, vinyl chloride, a $C_1$ to $C_{12}$ alkyl acrylate, a $C_1$ to $C_{12}$ alkyl methacrylate, hydroxyethyl acrylate, hydroxypropyl acrylate, and mixtures thereof.

3. The aqueous based poly(vinyl alcohol)-containing emulsion copolymer of claim 1 wherein the one or more other ethylenically unsaturated monomer is selected from the group consisting of ethylene, vinyl chloride, ethyl methacrylate, methyl methacrylate, 2-ethylhexyl acrylate, butyl acrylate, propyl acrylate, ethyl acrylate, methyl acrylate, hydroxyethyl acrylate, and hydroxypropyl acrylate.

4. The aqueous based poly(vinyl alcohol)-containing emulsion copolymer of claim 1 wherein the poly(vinyl alcohol) has a degree of polymerization of 100 to 5000 and is 70 to 99 mole % hydrolyzed.

5. The aqueous based poly(vinyl alcohol)-containing emulsion copolymer of claim 1 wherein the poly(vinyl alcohol) has a degree of polymerization of 200 to 3500 and is 85 to 99 mole % hydrolyzed.

6. The aqueous based poly(vinyl alcohol)-containing emulsion copolymer of claim 1 comprising 5 to 30 wt % vinyl ethylene carbonate, 25 to 93 wt % vinyl acetate, 0 to 10 wt % of one more other ethylenically unsaturated monomer, and 2 to 35 wt % poly(vinyl alcohol), based on the total weight of all components of the emulsion copolymer.

* * * * *